United States Patent [19]

Higginbottom

[11] Patent Number: 4,501,864
[45] Date of Patent: Feb. 26, 1985

[54] POLYMERIZABLE COMPOSITIONS COMPRISING POLYAMINES AND POLY(DIHYDROBENZOXAZINES)

[75] Inventor: Harold P. Higginbottom, Wilbraham, Mass.

[73] Assignee: Monsanto Company, St. Louis, Mo.

[21] Appl. No.: 564,638

[22] Filed: Dec. 22, 1983

[51] Int. Cl.³ .............................................. C08G 73/06
[52] U.S. Cl. ..................... 525/484; 525/481; 525/503; 525/504; 528/86; 528/124; 528/172; 528/210; 528/211; 528/423
[58] Field of Search ................. 528/172, 210, 211, 86, 528/124, 423; 525/481, 484, 503, 504

[56] References Cited

U.S. PATENT DOCUMENTS

| | | | |
|---|---|---|---|
| 2,825,728 | 3/1958 | Rigterink | 260/244 |
| 2,826,575 | 3/1958 | Rigterink | 260/244 |
| 3,408,326 | 10/1968 | Errede | 528/210 |
| 3,563,920 | 2/1971 | Tomalia et al. | 528/210 |
| 3,738,961 | 6/1973 | Tomalia et al. | 528/210 |

FOREIGN PATENT DOCUMENTS 1437814  6/1976  United Kingdom ............... 260/244

OTHER PUBLICATIONS

Burke et al., J. Am. Chem. Soc., 72, 4691 (1950).
Burke et al., J. Org. Chem., 26, 4403 (1961).
Burke et al., J. Org. Chem., 30, 3423 (1965).
Kuehne, J. Med. Pharm. Chem. 5, 257 (1962).
Bishop, Dissertation Summary, 63-1372, University Microfilms Inc., Ann Arbor, MI, Aug. 1962.

*Primary Examiner*—Lester L. Lee
*Attorney, Agent, or Firm*—R. Bruce Blance; William J. Farrington; Paul D. Matukaitis

[57] ABSTRACT

A polymerizable composition comprising a poly(3,4-dihydro-3-substituted-1,3 benzoxazine) and a reactive polyamine, wherein the polyamine is at least difunctional and its reactive groups are primary or secondary amine and wherein the poly(dihydrobenzoxazine) is the reaction product of about 1 equivalent of a primary amine, about 1 equivalent of a phenol and about two equivalents of formaldehyde. The compositions are useful as potting, encapsulating and laminating resins and as surface coatings.

29 Claims, No Drawings

POLYMERIZABLE COMPOSITIONS COMPRISING POLYAMINES AND POLY(DIHYDROBENZOXAZINES)

This invention relates to compositions comprising poly(dihydrobenzoxazines) and polyamines containing primary or secondary amine groups. The invention further relates to methods of curing the compositions of the invention and to the resultant cured products and to their use as protective coatings.

W. J. Burke et al (J. Org. Chem 30, 3423 (1965) and J. L. Bishop (Thesis, Univ. of Utah 1962) describe the potential reactions of dihydro-1,3-benzoxazines with a number of different types of compounds (HY) characterized by the presence of a highly nucleophilic carbon or nitrogen atom.

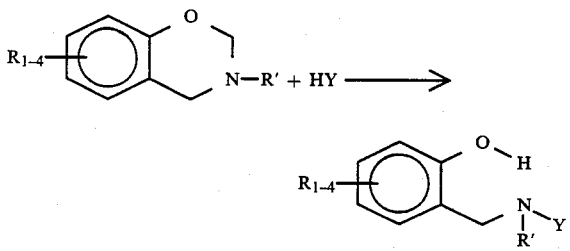

These ring opening aminoalkylation reactions as described by Burke and Bishop do not liberate volatiles. The reaction aptitude depends both on the structure of the 1,3-dihydrobenzoxazine and on the structure of the nucleophile containing molecule. Burke and Bishop do not include primary amines among the HY compounds, or secondary amines except for the heterocyclic secondary amines, indole and carbazole which are incapable of providing polymerization systems. No polymerization reactions of dihydrobenzoxazines are described.

Rigterink describes the formation of poly(dihydrobenzoxazines) from various combinations of polymethylene diamines and phenols (U.S. Pat. No. 2,826,575) and from amines with bis-phenols (U.S. Pat. No. 2,825,728). These materials were used as parasiticides.

Burke et al (J. Am. Chem. Soci., 72, 4691 (1950) and J. Org. Chem., 26, 4403 (1961)) and Kuehne et al (J. Med. Pharm. Chem., 5, 257 (1962)) describe the formation of poly(dihydrobenzoxazines) of polyhydric phenols and amines but do not discuss the polymerization of these poly(dihydrobenzoxazines) or their reaction with amines.

H. Schreiber (British Pat. No. 1,437,814) describes the preparation and use of dihydrobenzoxazine polymers and prepolymers. These materials are relatively slow curing by themselves and in the presence of resins and polymerizable compounds. Specifically, the heating of these materials both alone and with epoxy resins typically provides gel times of several hours at temperatures >100° C.

The present invention provides a composition comprising a reactive polyamine and a poly(3,4-dihydro-3-substituted-1,3-benzoxazine). The reactive polyamine contains primary and/or secondary amine groups which react with the dihydrobenzoxazine groups of the poly(hydrobenzoxazine) to cure the composition. The poly(dihydrobenzoxazines) are oligomeric mixtures wherein the majority of individual molecules contain at least two 3,4-dihydro-3-substituted-1,3-benzoxazine moieties.

The compositions of the invention cure more rapidly than dihydrobenzoxazines cured by themselves or in previously disclosed combination with other polymerizable compounds such as epoxides. For example the poly(dihydrobenzoxazines) are capable of reacting with primary or secondary amines in the temperature range of about 25° to about 200° C. in times less than 30 minutes. The reaction between a dihydrobenzoxazine and an amine generates very little volatile matter since it involves a ring opening aminoalkylation reaction. Further, poly(dihydrobenzoxazines) can be selected which have long pot lives when combined with primary and/or secondary amine containing polyamines but which react rapidly and efficiently at elevated temperatures. This contrasts with most epoxy resin systems combined with polyamines which have a relatively brief pot life. The polyamines can be readily modified to increase pot life even more when used in combination with dihydrobenzoxazines. Other aspects of the invention are directed to the method of curing the compositions of the invention, to the resultant cured products and to their use as protective coatings. Curing can be achieved over a broad pH range from moderately acid to highly basic. The only limitation for cure pH may be at low pH values where acid hydrolysis of the dihydrobenzoxazine ring can occur and protonation of the amine by the acid can retard reaction.

Depending on the structure of the polyamine and poly(dihydrobenzoxazine) a wide range of desirable cured properties are obtained in the cured composition including chemical resistance, toughness, flexibility and hardness. When the compositions of the invention are applied as coatings to metallic substrates and cured they provide good corrosion resistance to the substrates.

The ring opening aminoalkylation reaction of 3,4-dihydro-1,3 benzoxazine with an amine group produces a methylene diamine linkage.

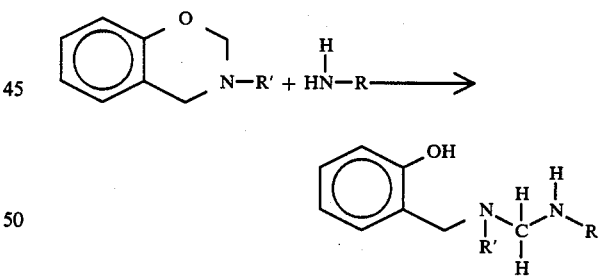

This methylene diamine bridge consisting of a single carbon joining two amine groups forms the major polymerization linkage when poly(dihydrobenzoxazines) are reacted with polyamines. Amine compounds where two amine nitrogen atoms are joined to a single carbon atom are generally regarded to be unstable and can usually be isolated only as their acid salts or in complex cyclic ring structures such as hexamethylene tetramine. In contrast, the cured compositions of the present invention comprising such diamine bridges possess surprising toughness, durability and excellent chemical resistance to solvents and corrosive environments. Thermal resistance of the cured systems is more than adequate for conventional protective coating applications.

The dihydrobenzoxazines are prepared by the condensation of a phenol, a primary amine and formaldehyde, the condensation product being substantially formaldehyde free and incapable of generating formaldehyde at the curing step. The base strength $pK_b$ of the primary amines may be in the range of 3 to 13. The poly(dihydrobenzoxazines) prepared from aromatic amines with $pK_b > 7$, generally yield mixtures and solutions with polyamines which are more stable at room temperature yet cure more completely at lower temperatures than compositions of polyamines and poly(dihydrobenzoxazines) derived from more basic amines with $pK_b < 7$. This result runs contrary to the well known generalization that the aminoalkylation aptitude of a dihydrobenzoxazine increases with basicity of the amine from which the oxazine is derived.

Poly(dihydrobenzoxazine) compounds suitable for admixture with polyamine compounds to provide the uncured compositions of the present invention can be prepared by a variety of techniques from many types of coreactants. Many of the preferred dihydrobenzoxazines are oligomeric mixtures wherein the majority of individual molecules contain at least two 3,4-dihydro-3-substituted-1,3-benzoxazine groups. The dihydrobenzoxazines can be made by reacting about one equivalent of an amine containing at least two primary groups with about two equivalents of formaldehyde and about one equivalent of a monophenol containing at least one unsubstituted ortho position. Suitable di-primary amines include hydrazine, and $C_2$ to $C_{40}$ unsubstituted and substituted di-primary amines such as bis(aminophenyl)alkanes, diaminobenzenes, diaminoalkanes, diaminocycloalkanes and various polyoxyalkylene diamines. Suitable polyamines include poly(aminophenyl)alkanes, alkane polyamines and polyoxyalkylene polyamines. Diaminobenzenes and bis(aminophenyl)alkanes are preferred amino reactants. The optional substituents of these di- and polyamines include alkyl, alkoxy, aryl and halo substituents. Examples of suitable phenols include $C_6$ to $C_{20}$ phenols such as phenol, alkyl phenols, alkoxy phenols, aryl phenols, halophenols, naphthols and other aromatic hydroxy materials which have at least one unsubstituted position ortho to each hydroxy group and which may contain substituents which do not substantially deactivate these unsubstituted ortho positions and do not react with primary amine groups, such as alkyl, alkoxy, aryl or halo substituents.

A second method for making poly(dihydrobenzoxazines) is by the reaction of an unsubstituted or substituted primary amine, and formaldehyde with a $C_6$ to $C_{30}$ polyphenol containing at least two hydroxysubstituted aromatic rings each with at least one unsubstituted position ortho to each hydroxy group optionally containing substituents such as alkyl, alkoxy, aryl or halo substituents which do not substantially deactivate the unsubstituted ortho positions and do not react with primary amines. The reaction ratio is typically about one equivalent of such polyphenol to one equivalent of primary amine, and two equivalents of formaldehyde. The primary amines may contain alkyl, alkoxy, aryl or halo substituents. Suitable primary amines contain from one to twenty carbon atoms and include aminoalkanes, aminocycloalkanes, aminoalkenes, amino glycols, and arylamines such as aniline and naphthylamine. Aniline and substituted anilines are preferred amine reactants. Suitable polyphenols include hydroquinone, resorcinol and catechol, biphenols, naphthalenediols, phloroglucinol, bisphenols, novolac resins prepared from phenol and substituted phenols, and the alkyl, alkoxy, aryl and halo substituted derivatives of these polyphenols. Preferred polyphenols include hydroquinone, bisphenol A, bis(4-hydroxyphenyl)methane, 4-hydroxyphenyl ether, 4-hydroxyphenyl sulfone, and 4,4'-bisphenol.

A third method for preparing poly(dihydrobenzoxazines) is provided by the reaction of a mixture of any of the above listed monophenols and/or polyphenols with a mixture of any of the above listed monoamines and/or polyamines and formaldehyde to form oligomers of average molecular weight in the range of about 300 to about 2000, containing an average of at least about two dihydro-1,3-benzoxazine moieties per molecule. Many reaction combinations are possible but to maximize dihydrobenzoxazine formation, 1 phenol group and 2 molecules of formaldehyde should be present for each amine group in the reaction mixture.

The poly(dihydrobenzoxazine) portion of the composition of the present invention can consist of one type of dihydrobenzoxazine or a mixture of dihydrobenzoxazines derived from different phenols and/or different amines. These mixtures can be obtained either by blending already formed dihydrobenzoxazines or by forming mixed dihydrobenzoxazine products by using a blend of reactants as set forth hereinabove.

Generally in the preparation of dihydrobenzoxazine prepolymers 100% conversion of the amine reactant to dihydrobenzoxazine does not occur because of side reactions. The products of the side reaction are for the most part characterized by the formation of dibenzyl amine linkages between the ortho and para positions of adjacent phenol rings. Once these dibenzyl amine linkages form it becomes impossible for the bridged amine group to participate in heterocyclic dihydro-1,3-benzoxazine ring formation. For example, products typically formed from diamines with monophenol and formaldehyde or from diphenols with monoamines and formaldehyde, will contain the expected bis(dihydrobenzoxazines), but will also contain lesser amounts of higher molecular weight oligomers typically having at least two terminal dihydrobenzoxazine groups but also having one or more internal dibenzylamine linkage. Typical products made by the disclosed method will have 50 to 95% of the amine groups in the 3-position of the dihydrobenzoxazine ring. The remaining 5 to 50% of the amine groups will be principally in the form of dibenzylamine bridging. Another side reaction which can occur during and after dihydrobenzoxazine formation is the condensation of a formed dihydrobenzoxazine ring with a non-heterocyclized phenol ring containing an unreacted ortho or para ring position via an aminoalkylation reaction. This ring opening addition reaction results in dibenzylamine formation. These side reactions increase the molecular weight and may decrease the dihydrobenzoxazine functionality causing undesirable effects in the two component compositions of the present invention. These undesirable effects include reduced pot life and higher viscosity. Other side reactions are the conventional condensation of formaldehyde with phenols to form methylol groups and methylene bridges. These side reactions are controlled by the reaction method set forth herein.

My preferred method for making dihydrobenzoxazines for use in this invention involves combining the phenol, amine and formaldehyde in the presence of a process solvent at temperatures which minimize the side reaction products. Aqueous formaldehyde can be added to a solution of amine and the phenol in the process solvent. In cases where the amine e.g. hexamethylene diamine reacts initially with formaldehyde to form crosslinked amine formaldehyde intermediates which are difficult to redissolve, it is preferable to make a dispersion of the phenol, process solvent and formaldehyde and add the amine or a solution of amine slowly to this dispersion. The process solvent is selected on the basis of its ability to dissolve the poly(dihydrobenzoxazine) reaction product and form immiscible phases with water and/or form azeotropic compositions with water. It is also desirable if possible for the process solvent to be a solvent for the two-component systems disclosed in this invention. Preferred solvents include methylene chloride, toluene, xylene and n-butanol or mixtures of these with themselves or other solvents. Many other solvent choices are possible. Other solvents can be added at the end of the process to make the poly(dihydrobenzoxazine) compatible with the polyamine component and to meet the requirements of the end use. Formaldehyde can be introduced in any of the forms which provide or generate formaldehyde such as aqueous formalin, formaldehyde in methanol, solid paraform or trioxane. Generally, concentrated aqueous formaldehyde solutions are preferred for economic reasons, but alcoholic formalin is often desirable when solubility problems are encountered durng poly(dihydrobenzoxazine) formation. It is generally preferable to combine the reactants below 55° C. to minimize the undesirable side reaction of formaldehyde condensing with phenol to form methylol groups which can generate cure volatiles at the time of use. Such side reactions can also be minimized by reacting the primary amine with formaldehyde to form an amine formaldehyde intermediate product which is then reacted with the phenol to form the dihydrobenzoxazine.

There is a distinct difference in the sensitivity of different dihydrobenzoxazine compositions to side reactions during processing. Dihydrobenzoxazines made from amines which are more basic ($pK_b<7$) are more sensitive to side reactions during processing and consequently give lower dihydrobenzoxazine yields. Advantageously these dihydrobenzoxazines are processed in a temperature range of 20° to 70° C. Dihydrobenzoxazines based on amines with $pK_b>7$ are less subject to side reactions and are advantageously processed in the 40° C. to 120° C. range. Advantageously after the addition of the reactants, which is done at the low end of the appropriate temperature range, the reaction is refluxed at an intermediate temperature in the appropriate range to maximize dihydrobenzoxazine formation. The reaction is then completed by removing water and unreacted monomers and possibly solvent at the middle to high temperature point of the appropriate reaction range. With a process solvent such as methylene chloride, the completed reaction mixture separates into two layers and the upper aqueous layer can be withdrawn. The methylene chloride and remaining water can then be removed by vacuum distillation. It is generally preferable to remove water by azeotropic distillation to increase the extent of reaction of the components forming the dihydrobenzoxazine and to minimize the loss of organic materials in the water layer. It is generally advantageous to use a stoichiometric excess of formaldehyde. This excess improves the conversion. An excess of 1 to 5% is preferable. The excess unreacted formaldehyde can be very efficiently removed with the water removed from the reaction mixture. Stripping of water and process solvent under reduced pressure also effectively removes unreacted formaldehyde. It is also sometimes desirable to use a slight excess in the range of about 1 to about 5 percent of the primary amine used to form the dihydrobenzoxazine above 1 equivalent for each phenolic hydroxyl. However, at least 2 equivalents of formaldehyde based on the total amine should be present to react with the amine.

The specific composition of the phenol and amine used to form the poly(dihydrobenzoxazine) can also significantly affect the yield and the potential for side reactions. For example, a para alkyl substituted phenol reactant reduces the level of ring opening amino alkylation side reactions.

The resulting poly(dihydrobenzoxazines) are also different in their property behavior depending on whether or not they are formed from a strongly basic or a weakly basic amine. Table I compares the characteristics of poly(dihydrobenzoxazines) in these two categories manifested during manufacture and use. However, the presence of various substituents on the benzoxazine molecule can alter strict adherence to these categorized characteristics.

TABLE I

Comparison of Poly(dihydrobenzoxazines) Prepared from Strongly Basic Amines and Weakly Basic Amines

| Poly(dihydrobenzoxazines) from amines with $pK_b<7$ | Poly(dihydrobenzoxazines) from amines with $pK_b>7$ |
|---|---|
| More subject to side reactions during and after preparation. | Less subject to side reactions during and after preparation. |
| Lower dihydrobenzoxazine yield | Higher dihydrobenzoxazine yield. |
| Sensitive to aging in polar and protic solvents. Less sensitive to aging in non polar solvents. | Not sensitive to aging in polar and non polar solvents. |
| Stable as 100% solids at 25° C. | Stable as 100% solids at 25° C. |
| More sensitive to ring opening aminoalkylation reaction. | Less sensitive to ring opening aminoalkylation reaction. |
| More sensitive to acids and hydrolysis of dihydrobenzoxazine ring. | Less sensitive to acids and hydrolysis of dihydrobenzoxazine ring. |
| More tendency to form high viscosity association products with polyamine components in solution. | Less tendency to form high viscosity association products with polyamine components in solution. |
| Tendency toward short pot life when blended with polyamines. | Tendency toward long pot life when blended with polyamines. |

There is probably not a sharp demarcation with increasing $pK_b$ but a gradual transition. In respect to these differences and the fact that the dihydrobenzoxazines derived from weakly basic amines show greater stability and are more resistant to side reactions and aging effects, it is an unexpected and a surprising result of this invention that these weakly basic amine products will react as fast or faster and often more completely than the strongly basic amine products with the polyamine components of the two component systems of the present invention.

Purified dihydrobenzoxazine oligomers can be used in the practice of this invention but they generally offer no significant advantages over the oligomers containing controlled levels of side reaction products. Also they are not as economical to make and consequently not as commercially viable.

The coreactants for dihydrobenzoxazines which provide the second component of the compositions of this invention include a large variety of compounds which contain primary or secondary amine groups. Advantageously, such polyamines contain at least two primary and/or secondary amine groups per molecule, have molecular weights in the range of about 58 to about 15,000 and have amine equivalent weights in the range of about 29 to about 1500. Preferably the polyamines are oligomers of molecular weight in the range of about 100 to about 5,000 and have amine equivalent weights in the range of about 50 to about 1000. The rate of cure of the compositions of the present invention can be regulated by adjusting the ratio of primary to secondary amine groups in the polyamine molecule. For fast rate of reaction of the polyamine compound with the dihydrobenzoxazine component, the majority of the amine groups of the polyamine should be primary. Moreover the position and environment of the amine groups in the polyamine can be important since steric hinderance can influence the rate of reaction.

Low molecular weight polyamines which can be used as crosslinkers or hardeners for poly(dihydrobenzoxazines) include those $C_2$ to $C_{40}$ amines typically classed as curing agents for epoxy resins. These include the alkane polyamines such as ethylene diamine, diethylene triamine, triethylene tetraamine, hexamethylene diamine, trimethylhexamethylene diamine, bis-hexamethylene triamine and triaminononane; the polyamino-cycloalkanes such as isophorone diamine, bis-(aminomethyl)norbornane, and diaminocyclohexanes; the polyoxypropyleneamines commercially known by the tradename "Jeffamines", (sold by Jefferson Chemical Co., Inc. a subsidiary of Texaco Inc.) the polyamines based on heterocyclic backbones such as 1,4-bis(3-aminopropyl)piperazine and 4-aminomethylpiperidine; the aromatic polyamines such as benzene, toluene and xylene diamines and the methylene dianilines. Also included are a large variety of commercial polyamines based on fatty acid chemistry including dimer acid based products such as Versamine ®551 and 552 (sold by Henkel Corporation) and Kemamine ®DP-3680 and DD-3680 (sold by Humko Chemical Div., Witco Chemical Corp.).

Amine groups can be introduced into a variety of backbone polymeric or oligomeric structures containing functional groups such as oxirane, isocyanate and carboxy, by reacting these materials under conditions, well known to the art with low molecular weight polyamines or amine intermediates. Amine groups can be attached to oligomers such as polyester, acrylic, and urethane oligomers having carboxy groups, by reacting the carboxy groups with difunctional amines. Also such free carboxy groups can be reacted with alkyleneimine or substituted alkyleneimine, as set forth in U.S. Pat. No. 3,679,564 and U.S. Pat. No. 3,617,453.

Blocked amines can be attached to backbone polymers and oligomers and subsequently transformed into primary amine groups. Such blocked amine groups can be attached to epoxy resins or acrylic resins having pendant oxirane groups by reacting a ketimine derived from reacting an excess of ketone with a polyamine containing at least one primary amine group and a secondary amine group. Blocked amines reacted with epoxy resins are described in U.S. Pat. No. 4,379,911. Blocked amines can also be reacted with carboxy containing compounds such as dimerized fatty acids as described in U.S. Pat. No. 3,523,925.

Representative polyamine polymers containing amine groups can be derived from epoxy and epoxy-modified diglycidyl ethers of bisphenol A, various aliphatic polyethylene or polypropylene glycol (diglycidyl ether) adducts, and glycidyl ethers of phenolic resins, such epoxy resins being commercially available. The preparation of adducts of polyepoxide resins and polyamines is described in detail in U.S. Pat. Nos. 4,093,594 and 4,111,900. Polyadducts of ammonia and epoxide compounds are described in U.S. Pat. No. 4,310,645.

Polyamine polymers containing primary and secondary amine groups can be modified further by reacting them partially with monoepoxides, diepoxides or other amine reactive reagents. These reactions can be used to moderate the reactivity of the polyamine component with dihydrobenzoxazines. Also, such reactions can be used to plasticize, flexibilize and otherwise modify the properties of the cured compositions of the present invention.

The polyamine component can also be modified by forming ketimine derivatives of the pendant primary amine groups or by forming organic acid salts of the pendant amines. When these modified polyamine components are combined with certain poly(dihydrobenzoxazine) components disclosed herein, they form more stable two component compositions. The systems are made curable by hydrolyzing the ketimine or by volatilizing the organic acid by application of heat.

The polyamine component can also be in the form of oxazolidine functional polymer. In this case pendant secondary amine groups are blocked by the formation of oxazolidine derivatives. Mixtures of polybenzoxazines with oxazolidine blocked polyamines are stable until hydrolysis frees the reactive secondary amine functions which then become heat curable. Methods of preparing certain oxazolidinefunctional polymers are described in U.S. Pat. No. 4,373,008.

Other useful polymers containing amine groups include polyamide resins, for example, condensation products of dimerized fatty acids coreacted with difunctional amine, such as ethylene diamine. Polyamide resins generally have a molecular weight between about 500 and 5,000. Further useful polymers containing amine groups include amine modified acrylic resins, polyester resins and polyurethane resins having a molecular weight range of about 500 to about 5,000.

The relative proportions of polybenzoxazine and polyamine components to allow the compositions of the present invention to cure, may fall within a wide range depending upon the particular composition of each of the components. For maximum cure response at least one dihydrobenzoxazine group is present to react with each primary amine group present in the polyamine. However, additional dihydrobenzoxazine groups may be present to react with the secondary amine groups of the polyamine or with the secondary amine groups which form when a dihydrobenzoxazine reacts with a primary amine group. In general, the amount of dihydrobenzoxazine functionality used is sufficient to react with enough of the primary and/or secondary amine groups present in the polyamine to result in crosslinking at elevated temperature cure to whatever extent is desired or needed to obtain a satisfactory balance or combination of mechanical properties and chemical and solvent resistance in the cured composition. The ratio of poly(dihydrobenzoxazine) to polyamine advantageously may fall in the range of 0.2 to 3.0 equivalents of dihydrobenzoxazine group in the poly(dihydrobenzoxazine) per equivalent of actual and/or potential primary and/or secondary amine in the polyamine.

The two component compositions of the present invention may be cured at a temperature in the range of about 50° to about 200° C. Preferably curing is effected in the temperature range of about 100° to about 160° C. when the dihydrobenzoxazine component is derived from an aromatic amine and the amine component of the two component composition is a primary amine. When the benzoxazine component is derived from an aliphatic amine, the cure temperature is preferably in the range of about 130° to about 180° C.

The two component compositions of the present invention can be catalyzed with selected catalysts to speed or accelerate the cure at a given temperature or to enhance the degree of cure at a lower temperature. The more effective catalysts are generally Lewis acids, metal salts or complex compounds (particularly chelates). Suitable Lewis acids include iron-II-chloride, iron-III-chloride, zinc chloride, tin-II-chloride, tin-IV-chloride, aluminum-chloride, zinc cyanide, borontrifluoride and borontrifluoride etherate.

Suitable metal salts are salts of transition metals, if they do not come within the group of Lewis acids such as cobalt-, manganese- and lead-naphthenates; iron oleates; zinc, tin and organotin salts of $C_1$-$C_{20}$ carboxylic acids such as zinc and tin (II)-naphthenates, hexoates, octoates, palmitates, stearates and dimethylvalerates; dibutyltin diacetate, dibutyltin dioctoate, and dibutyltin dilaurate; and acetates, chlorides, sulphates and octoates of bi- and trivalent cobalt, of mono- and bivalent copper and bivalent lead. Suitable complex compounds include carbonyls of nickel, iron, molybdenum, cobalt, manganese and tungsten; acetyl acetonates of iron, copper, nickel, cobalt, zinc, lead, aluminum, manganese, magnesium, molybdenum, titanium, thorium, zirconium and vanadium; bis-(dibenzoylmethane)-copper; bis(ethylacetoacetate)-copper and -iron; co-ordination compounds of titanium, zirconium, hafnium, thorium and manganese with $\beta$-diketones, $\beta$-ketoesters and $\beta$-hydroxyaldehydes; di(2-ethylhexyl)-tin oxide and dioctyl tin oxide.

Catalysts which are particularly suitable are: zinc octoate, tin octoate, dibutyltin diacetate, dibutyltin dimaleate, dibutyltin dilaurate, cobalt triacetate, cobalt trioctoate, copper (II)-acetate, and zirconium octoate. The quantity of catalyst used is generally in the range of from 1 ppm to 20% by weight preferably from 100 ppm to 5% by weight based on the total weight of the reactants. However, it may be practically advantageous to keep the concentration of the catalyst as low as possible. The optimum catalyst concentration depends on the nature of the starting material and on the activity of the particular catalyst and can be readily determined by techniques known to those in the art. Selection of an appropriate catalyst is frequently determined by its compatibility with the polymerizable composition.

The two component compositions of this invention are used as potting, encapsulating, molding and laminating resins and as surface coatings. They are conveniently used as solutions in organic solvents for surface coating applications. The poly(dihydrobenzoxazines) are generally soluble in chlorinated hydrocarbons, aromatic hydrocarbons cyclic ethers and the glycol ether solvents. Ketones such as methyl ethyl ketone and methyl isobutyl ketone can also be used as solvents. Mixed solvents can be used with the poly(dihydrobenzoxazines) and often improve compatibility with various polyamine coreactants. Preferred solvents include 2-ethoxyethanol, and 2-butoxyethanol and mixtures of these glycol ether solvents with xylene and toluene. The polyamine components are generally soluble in the same solvents as the poly(dihydrobenzoxazine). The poly(dihydrobenzoxazine) and polyamine solutions can be mixed and stored as a one package system or mixed just prior to use depending upon the stability of the mixtures. As disclosed herein, dihydrobenzoxazines derived from weakly basic amines generally form more stable solutions with polyamines than do dihydrobenzoxazines derived from strongly basic amines. Improved storage stability with certain poly(dihydrobenzoxazines) is achieved by mixing them with a ketimine blocked polyamine. Hydrolysis of the ketimine at the time of application makes the two component coating system reactive. With certain poly(dihydrobenzoxazines) described herein it is possible to stabilize their solutions with polyamines by forming an organic acid salt with the amine groups in the polyamine. Volatile organic acids are preferred for forming salts with pendant amine groups and include formic acid, acetic acid, propionic acid, butyric acid, acrylic acid, methacrylic acid and cyclohexanoic acid. The organic acid is preferably an aliphatic monocarboxylic acid having up to 4 carbon atoms.

The concentration of the two component coating systems in solution can vary widely depending on the application requirements, economics and handling ease.

The coating composition can also contain pigments of the conventional type such as iron oxides, lead oxides, strontium chromate, carbon black, titanium dioxide, talc, barium sulfate, phthalocyanine blue and green, chromic green, zinc phosphates, lead silicate, silica, silicates and the like.

Defoamers, tints, slip agents, thixotropes and levelling agents are common auxiliary components to most coatings and may be employed in the compositions of the present invention.

The compositions of the present invention may be used for coating numerous substrates, such as metals, wood, glass, and plastics to produce thereon after curing at temperatures between 50° and 200° C., and preferably between 100° and 175° C., protective films which possess chemical resistance, corrosion resistance, durability, hardness, toughness, flexibility, and other mechanical properties. The compositions are particularly desirable as primer coatings for metal surfaces. They exhibit good adhesion to various substrates including galvanized metal, cold rolled steel (untreated and phosphate treated), hot rolled steel, and aluminum. The coating compositions of the present invention can be applied to a variety of solid substrates by conventional methods, such as flowing, spraying or dipping to form a continuous surface film.

The invention is further described and illustrated in the following examples which should not be construed as limiting its scope. All parts and percentages are by weight unless otherwise indicated. The percent closed dihydrobenzoxazine value represents the percentage of primary amine incorporated into dihydrobenzoxazine rings. The remainder is consumed in side reactions.

EXAMPLE I

Preparation of Dihydrobenzoxazine 1

To a suitably equipped glass resin reactor equipped with stirrer is charged 450 parts phenol, 450 parts toluene and 595 parts of 50% formalin. A uniform toluene-water dispersion is maintained with agitation. The temperature of the reaction mixture is adjusted to 25° C. and maintained below 30° C. while 144 parts of ethylene diamine are added slowly. The reaction mixture is stirred for 2 hours at 30° C. after the amine addition is complete. The reaction mixture is heated to 46° C. under reduced pressure and refluxed for 3 hours. After 3 hours the distillate is passed through an oil water separator in the distillate return line. The toluene is continuously returned to the reactor while the water is removed. Azeotropic water removal is continued while the batch temperature is increased to 69° C. and the pressure is gradually reduced to about 5.0 kPa. The reaction mixture is essentially water free. It is cooled while 150 parts of 2-butoxyethanol are added and mixed in. The clear pale yellow solution is filtered. The product had the following composition and properties: Percent closed dihydrobenzoxazine 66%; equivalent wt. 224; solids 55.2%; Brookfield viscosity 12 cps @25° C.

EXAMPLE II

Alternate Method For Benzoxazine 1

To a suitably equipped glass resin reactor equipped with stirrer is charged 450 parts phenol, 450 parts methylene chloride and 144 parts of ethylene diamine. The temperature of the reaction mixture is adjusted to 25° C. and 595 parts of 50% formalin is added while maintaining the temperature below 30° C. The reaction mixture is stirred for 2 hours at 30° C. after formaldehyde addition is complete. The reaction mixture is heated to atmospheric reflux and refluxed for 3 hours. The reaction mixture is allowed to cool and separate into two layers. The upper water layer is withdrawn and discarded. The lower organic layer is reheated to atmospheric reflux and distilled to remove solvent. Heating is continued with the gradual application of vacuum until a temperature of 70° C. at about 5.0 kPa pressure is reached. The very viscous product is removed from the reactor and allowed to cool. The light yellow semi-solid product has 67% closed dihydrobenzoxazine ring. Upon standing, the clear amorphous product slowly crystallizes to an opaque, grainy solid.

EXAMPLE III

Preparation of Dihydrobenzoxazine 2

The procedure of Example 1 is repeated except that 397.4 parts of 70% hexamethylene diamine are used in place of the ethylene diamine. The hexamethylene diamine (HMD) solution is added slowly with good agitation to prevent any buildup of polymeric HMD-formaldehyde condensate. The clear pale yellow solution of poly(dihydrobenzoxazine) has the following composition: Percent closed dihydrobenzoxazine 60%, equiv. wt. 330, solids 59.0%.

EXAMPLE IV

Preparation of Dihydrobenzoxazine 3

The procedure of Example III is repeated except that 719 parts of t-butylphenol is used in place of the 450 parts of phenol. The clear pale yellow solution of poly(dihydrobenzoxazine) has the following composition and properties. Percent closed dihydrobenzoxazine ring 69%, equiv. wt. 336, solids 63.8%; Brookfield viscosity 110 cps.

EXAMPLE V

Preparation of Dihydrobenzoxazine 4

To a suitably equipped glass resin reactor equipped with stirrer are charged 100 parts bisphenol A, 70 parts toluene and 81.5 parts of aniline. The slurry is warmed and agitated to form a uniform solution. An inert nitrogen atmosphere is maintained over the reaction mixture. The temperature of the reaction mixture is adjusted to 50° C. and 108 parts of 50% formalin are added slowly, while the temperature is maintained at 50° to 55° C. After formalin addition is complete the batch is refluxed at 65° C. for 1 hour under reduced pressure. The batch is then heated to atmospheric reflux and the reflux condensate is permitted to separate into an aqueous phase and organic phase in an oil/water separator. The organic phase of the condensate is returned to the reactor and the aqueous phase is removed. After about 83 parts of water are removed and the reaction temperature reaches 116° C., the clear product solution is cooled while 21 parts of 2-butoxyethanol are added. The clear pale yellow solution of poly(dihydrobenzoxazine) had the following composition and properties: percent closed dihydrobenzoxazine ring 83%, equiv. wt. 278, solids 71.6%, Brookfield viscosity 305 cps.

EXAMPLE VI

Preparation of Dihydrobenzoxazine 5

To a suitably equipped glass resin reactor equipped with stirrer are charged 228 parts of Bisphenol A, 240 parts toluene and 130.0 parts of monoethanolamine. The slurry is warmed and stirred to form a uniform solution. An inert nitrogen atmosphere is maintained over the reaction mixture. The temperature of the reaction mixture is adjusted to 50° C. and 256 parts of 50% formalin are added slowly, while the temperature is maintained at 50°–55° C. After formalin addition is complete the batch is refluxed at 70° C. for 3 hours under reduced pressure. The stirring is stopped and the reaction mixture is allowed to separate into two layers. The top water layer (175 parts) is removed. The remaining organic bottom layer is heated with the gradual application of vacuum to remove remaining solvent and other volatiles. When the temperature reaches 110° C. at a pressure of 3.5 kPa, the fluid resin is poured from the reactor and allowed to solidify. The resulting yellow product has a dihydrobenzoxazine ring content of 63%, a calculated equivalent weight of 316, and a softening point of 88° C. A solution of the resin dissolved in methyl ethyl ketone solvent is observed to gel after 1 month storage at room temperature. A sample in solid form shows no compositional change after 1 year at room temperature.

EXAMPLE VII

Preparation of Mixed Dihydrobenzoxazine 6

To a suitably equipped glass resin reactor equipped with stirrer are charged 228 parts of Bisphenol A, 240 parts toluene, 93.1 parts of aniline and 65.2 parts of monoethanolamine. The slurry is warmed and stirred to form a uniform solution. An inert nitrogen atmosphere is maintained over the reaction mixture. The temperature of the reaction mixture is adjusted to 50° C. and 256 parts of 50% formalin are added slowly, while the temperature is maintained at 45°–50° C. After formalin addition is complete the batch is refluxed at 60° C. for 3 hours under reduced pressure. The stirring is stopped and the reaction mixture is allowed to separate into two layers. The top water layer (167 parts) is removed. The remaining organic bottom layer is heated with the gradual application of vacuum to remove the remaining solvent and other volatiles. When the temperature reaches 110° C. at a pressure of 3.5 kPa, the fluid resin is poured from the reactor and allowed to solidify. The resulting yellow product has a dihydrobenzoxazine ring content of 69%, a calculated equivalent weight of 312, and a softening point of 78° C.

EXAMPLE VIII

Preparation of Polyamine A

Eight hundred and seventy five parts of polyglycidyl ether of Bisphenol A (sold by Shell Chemical Co. under the tradename Epon 1004F) possessing an epoxy equivalent weight of 875 is added to 516 parts of methyl isobutyl ketone and the mixture is stirred and heated to 60° C. to dissolve the epoxy resin while any water present is removed by azeotropic distillation under reduced pressure. At 60° C. under a dry nitrogen blanket, 414 parts of a methyl isobutyl ketone solution containing 267.4 parts of diketimine derived from one mole of diethylene triamine and 2 moles of methyl isobutyl ketone (as described in U.S. Pat. No. 3,523,925) are added and the batch is heated to 120° C. where it is held for 2 hours. The batch is cooled to 80° C. and 36 parts of water are added and mixed in to hydrolyze the ketimine. The pale yellow polyamine solution is cooled and filtered. The product has a calculated number average m.w. of 1956 and is essentially tetrafunctional in primary amine. The solids content of the product solution is 54.8%.

EXAMPLE IX

Preparation of Polyamine B

The procedure of Example VIII is repeated except that at 60° C. under a dry nitrogen blanket, 170.3 parts of a monoketimine derived from 1 mole of N-methyl-1,3-propane diamine and 1 mole of methyl isobutyl ketone are added in place of the diketimine and the batch is heated to 120° C. where it is held for 2 hours. The batch is cooled to 80° C. and 18 parts of water are added and mixed in to hydrolyze the ketimine. The dark yellow polyamine solution is cooled and filtered. The product has a calculated number average molecular weight of 1926 and is essentially difunctional in primary amine. The solids content of the solution is 68.2%.

EXAMPLE X

Preparation of Polyamine C

The procedure of Example VIII is repeated and after the addition of 36 parts of water, the reaction is cooled to 60° C. At 60° C., 229 parts of an aliphatic mono glycidyl ether (sold by Ciba Geigy under the tradename Araldite DY027) possessing an epoxy equivalent weight of 229 is added. The reaction mixture is held at 60° C. for 1 hour and then cooled and filtered. The product had a calculated number average molecular weight of 2414 and is essentially difunctional in primary amine and difunctional in secondary amine. The solids content is 64.4%.

EXAMPLE XI

Preparation of Polyamine D

The procedure of Example X is repeated except that in place of the Araldite DY027, 280 parts of a butyl glycidyl ether (sold by Ciba Geigy under the tradename Araldite RD-1) possessing an epoxy equivalent weight of 140 are added. After adding the monoepoxide at 60° C. and holding one hour the reaction mixture is heated to 120° C. for 2 hours. The solution is cooled and filtered. The product has a calculated average molecular weight of 2516 and is essentially tetrafunctional in secondary amine with a low residual primary amine content. The solids content is 62.0%.

Table II summarizes the properties of Examples VIII to XI made to have different reactive functionality arising from different levels of primary and secondary amine content.

TABLE II

POLYAMINE COMPONENTS - EPOXY BACKBONE

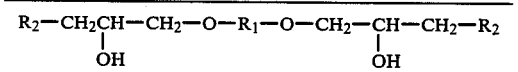

where:

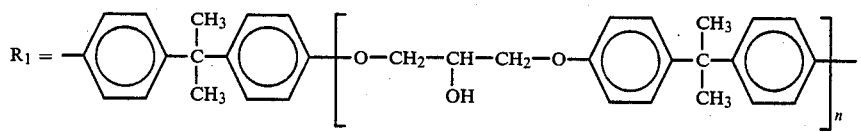

| Example | Polyamine | | Average M.W. | Approximate Reactive Amine Functionality and Type |
|---|---|---|---|---|
| VIII | A. | 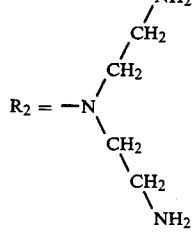 | 1956 | Tetrafunctional 1° Amine |

TABLE II-continued
POLYAMINE COMPONENTS - EPOXY BACKBONE

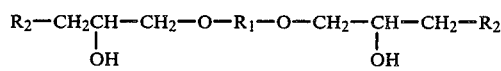

where:

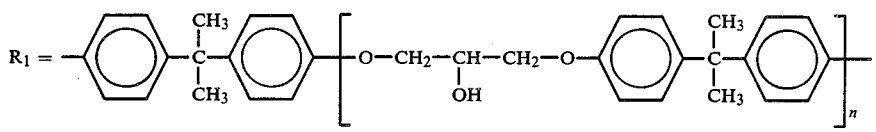

| Example | Polyamine | | | Average M.W. | Approximate Reactive Amine Functionality and Type |
|---|---|---|---|---|---|
| IX | B. | $R_2 = -\underset{\underset{CH_3}{\mid}}{N}-CH_2CH_2CH_2NH_2$ | | 1926 | Difunctional 1° Amine |
| X | C. | (branched amine structure) | 75% $R_3$ = H | 2414 | Difunctional 1° Amine |
| | | | 25% $R_3$ = Adduct of monoepoxide Araldite EY027 | | Difunctional 2° Amine |
| XI | D. | (branched amine structure) | 50% $R_3$ = H | 2516 | Tetrafunctional in 2° Amine |
| | | | 50% $R_3$ = Adduct of monoepoxide Araldite RD-1 | | |

EXAMPLE XII
Dihydrobenzoxazine Compositions

Eight coating compositions made from combinations of the four polyamines of Examples VIII to XI with different dihydrobenzoxazines are shown in Table III. Test results on coated metal test panels obtained under different cure conditions are included in the table. The coatings are normally draw coated at 50% solids solution on zinc phosphated test panels to give dry coatings of 28±5 microns in thickness. The results generally illustrate the excellent coating properties which can be obtained from the two component systems claimed in this invention when properly cured.

A comparison of Example XII-2 involving a dihydrobenzoxazine derived from a weak base amine (aniline) with Examples XII-3 and XII-4 involving dihydrobenzoxazines derived from stronger base amines was made using polyamine C formulated at constant equivalents of added dihydrobenzoxazine. Example XII-2 develops a combination of coating hardness, solvent resistance and corrosion resistance at cure temperatures 14° to 28° C. lower in temperature than Examples XII-3 and 4 containing dihydrobenzoxazines derived from strong base amines.

Further, dihydrobenzoxazine 4 derived from a weak base amine when used in Example XII-6, with high secondary amine containing polyamine D, also develops cure properties at temperatures at least 30° C. lower than Examples XII-7 and 8 based on the stronger base dihydrobenzoxazines combined with polyamine D.

The effect of using catalysis is also demonstrated by the data in Table III. Dihydrobenzoxazine 4 was combined with a low functionality polyamine B in Example XII-5. The cured film developed reasonable properties at 177° C. cure. However, with 1.5 to 2.0% levels of tin octoate catalyst excellent film properties were obtained at 149° C.

TABLE III
COATING COMPOSITIONS COMPRISING DIHYDROBENZOXAZINE AND POLYAMINE

| Example | Dihydro-benzoxazine | Polyamine | Weight Ratio | Equiva-[a] lents DHB per mole PA | Bake[b] Temp. °C. | MEK[c] rubs | Pencil Hardness | Gardner[d] Impact (Joules) | Salt Spray[e] 500 hr. |
|---|---|---|---|---|---|---|---|---|---|
| XII (1) | 4 | A | 36:64 | 4 | 149 | >200 | 4H | 2.26/2.83 | .02 |
| XII (2) | 4 | C | 26:74 | 3 | 121 | 200(37%) | 2H | 2.26/2.83 | .02 |
|  |  |  |  |  | 135 | 200(5%) | 2H | 2.83/3.39 | .02 |
|  |  |  |  |  | 149 | >200 | 4H | 3.39/3.96 | .02 |
|  |  |  |  |  | 177 | >200 | 5H | 3.39/3.96 | .02 |
| XII (3) | 1 | C | 22:78 | 3 | 135 | 70 | F | 1.13/1.70 | .02 |
|  |  |  |  |  | 149 | 200(75%) | 4H | 1.13/1.70 | .02 |
|  |  |  |  |  | 177 | >200 | 4H | 3.39/3.96 | .02 |
| XII (4) | 2 | C | 29:71 | 3 | 135 | 200(5%) | H | 2.26/2.83 | .15 |
|  |  |  |  |  | 149 | 200(5%) | 2H | 2.26/2.83 | .07 |
|  |  |  |  |  | 177 | >200 | 4H | 3.39/3.96 | .03 |
| XII (5) | 4 | B | 30:70 | 3 | 149 | 200(60%) | 3H | 2.26/2.83 | .03 |
|  |  |  |  |  | 177 | >200 | 5H | 2.83/3.39 | .03 |
|  |  |  |  |  | 149[f] | 200(5%) | 4H | 2.26/2.83 | .03 |
|  |  |  |  |  | 149[g] | >200 | 5H | 2.26/2.83 | .03 |
| XII (6) | 4 | D | 24:76 | 3 | 135 | 140 | F | 1.70/2.26 | .09 |
|  |  |  |  |  | 163 | >200 | 4H | 3.39/3.96 | .03 |
|  |  |  |  |  | 177 | >200 | 5H | 3.96/4.52 | .07 |
| XII (7) | 1 | D | 20:80 | 3 | 163 | 165 | 2H | 1.70/2.26 | .02 |
|  |  |  |  |  | 193 | >200 | 4H | 1.70/2.26 | .02 |
| XII (8) | 2 | D | 27:73 | 3 | 163 | 200(12%) | 3H | 1.70/2.26 | .03 |
|  |  |  |  |  | 193 | >200 | 4H | 1.70/2.26 | .02 |

[a]Number of equivalents of dihydrobenzoxazine based on active ring content for each average molecular weight unit of polyamine as indicated in Table II.
[b]All panels are baked for 20 minutes at indicated bake temperature in °C.
[c]MEK double rubs. Value in parenthesis indicates estimated amount of film removed after 200 rubs.
[d]Standard Gardner Impact test, forward-joules. Values represent pass/fail.
[e]Standard salt spray test ASTM B 117. Values are maximum scribe creep in inches after 500 hours.
[f]1.5% stannous octoate catalyst.
[g]2.0% stannous octoate catalyst.

EXAMPLE XIII
Dihydrobenzoxazine Compositions

Sixteen coating compositions made from combinations of eight low molecular weight polyamines with different dihydrobenzoxazines are shown in Table IV. Test results on coated metal test panels obtained under different cure conditions are included in the table. The coatings are normally draw coated at 50% solids solution on zinc phosphated test panels to give dry coatings of 28±5 microns in thickness. The results generally illustrate the excellent coating properties which can be obtained from the two component systems claimed in this invention when properly cured.

It is obvious from a comparison of the examples in the table that the nature of the polyamine can contribute significantly to the performance of the cured coating compositions. Certain polyamine dihydrobenzoxazine combinations such as Example XIII-16 where a polyoxypropylene backbone amine is used do not give as good salt spray corrosion results as compositions based on polymethylene based polyamines such as triaminononane shown in Examples XIII 4-9 or hexamethylene diamine in Example XIII-14. Compositions utilizing polyamines derived from dimer acid backbones result in cured coatings with higher flexibility as demonstrated by impact values in Examples XIII 10-12 and XIII 15.

The ultimate coating properties of a given composition are dependent on cure temperature and time. Examples XIII 4-6 show the property changes with a constant composition based on triaminononane and dihydrobenzoxazine 4 cured at three temperatures. As a general rule, compositions that give longer dry rubber cure times as illustrated in Table IV require higher temperatures or longer cure times to reach certain optimum coating properties such as solvent resistance. The Dry Rubber Cure data in Table IV also illustrate the better cure response of compositions utilizing dihydrobenzoxazine 4 derived from a weak base amine compared with dihydrobenzoxazines 2 and 3 derived from a strong base amine.

The Examples in Table IV illustrate the many possible polyamine structures that can be used in combination with dihydrobenzoxazines in practicing this invention. Many combinations of one or more polyamines with one or more dihydrobenzoxazines are possible and may be advantageously used to gain certain coating property or performance characteristics.

TABLE IV
COATING COMPOSITIONS COMPRISING DIHYDROBENZOXAZINE AND LOW M.W. POLYAMINE

| Example | Dihydro-benzox-azine | Polyamine | Weight Ratio | Equiva-[a] lents DHB per primary amine equivalents | D.R. Cure @ 135° C. (sec.) | Bake[b] Temp. °C. | MEK[c] Rubs | Pencil Hardness | Gardner[d] Impact Joules | Salt Spray[e] 500 hr., mm. |
|---|---|---|---|---|---|---|---|---|---|---|
| XIII 1 | 4 | Diethylene triamine | 1/.14 | 1.33 | 211 | 149 | >200 | 4H | 1.13/1.70 | 1.27 |
| 2 | 2 | " | 1/.13 | 1.33 | 260 | 149 | >200 | 6H | 1.70/2.26 | 0.25 |
| 3 | 3 | " | 1/.11 | 1.33 | >600 | 149 | 125 | 2H | 0/0.57 | 0.25 |
| 4 | 4 | Triaminononane | 1/.19 | 1.00 | 103 | 121 | 200 (15%) | 5H | 0.57/1.13 | 0.76 |
| 5 | 4 | " | 1/.19 | 1.00 | 103 | 135 | >200 | 6H | 2.83/3.39 | 0.25 |

TABLE IV-continued
COATING COMPOSITIONS COMPRISING DIHYDROBENZOXAZINE AND LOW M.W. POLYAMINE

| Example | Dihydro-benzox-azine | Polyamine | Weight Ratio | Equiva-[a] lents DHB per primary amine equi-valents | D.R. Cure @ 135° C. (sec.) | Bake[b] Temp. °C. | MEK[c] Rubs | Pencil Hard-ness | Gardner[d] Impact Joules | Salt Spray[e] 500 hr., mm. |
|---|---|---|---|---|---|---|---|---|---|---|
| 6 | 4 | " | 1/.19 | 1.00 | 103 | 149 | >200 | 7H | 3.39/3.96 | 0.25 |
| 7 | 4 | " | 1/.14 | 1.33 | 134 | 149 | >200 | 7H | 2.26/2.83 | 0.25 |
| 8 | 2 | " | 1/.14 | 1.33 | 134 | 149 | >200 | 6H | 2.26/2.83 | 0.25 |
| 9 | 3 | " | 1/.12 | 1.33 | >600 | 149 | >200 | 8H | 3.39/3.96 | 0.25 |
| 10 | 4 | Versamine 552 | 1/.71 | 1.33 | 230 | 149 | >200 | 2H | 13.6/14.7 | 1.78 |
| 11 | 3 | " | 1/.61 | 1.33 | >600 | 177 | >200 | F | >18 | 0.25 |
| 12 | 4 | Kenamine 003680 | 1/.71 | 2.00 | 458 | 149 | >200 | F | >18 | 1.78 |
| 13 | 4 | Methylene Dianiline | 1/.54 | 1.33 | 362 | 149 | >200 | 5H | 4.52/5.09 | 1.02 |
| 14 | 4 | Hexamethyl-ene diamine | 1/.16 | 1.33 | 214 | 149 | >200 | 5H | 1.70/2.26 | 0.76 |
| 15 | 4 | Versamine 551 | 1/0.48 | 2.00 | 388 | 149 | >200 | 2H | 6.22/6.78 | 1.27 |
| 16 | 4 | Jeffamine T403 | 1/0.42 | 1.33 | 339 | 149 | >200 | 7H | 3.39/3.96 | 0.51 |

[a]Number of equivalents of dihydrobenzoxazine based on active ring content for each equivalent of primary amine in the polyamine.
[b]All panels are baked for 20 minutes at indicated bake temperature in °C.
[c]MEK double rubs. Value in parenthesis indicates estimated amount of film removed after 200 rubs.
[d]Standard Gardner Impact test, forward-joules. Values represent pass/fail.
[e]Standard salt spray test ASTM B 117. Values are maximum scribe creep in inches after 500 hours.

EXAMPLE XIV

Ketimine Formation From Versamine 552

To a suitably equipped glass resin reactor equipped with a stirrer is charged 274 parts of Versamine 552 (primary amine equivalent wt.=274) and 280 parts of methyl isobutyl ketone (MIBK). The reaction is kept under an inert nitrogen atmosphere and heated to atmospheric reflux. The distillate is passed through an oil/-water separator and the water is removed and MIBK is returned to the reactor. Heating and water removal is continued until water evolution ceases (~18 parts water). The solution is cooled and stored under dry nitrogen. The light yellow solution contains 67.0% of the MIBK ketimine of Versamine 552.

EXAMPLE XV

Stabilized Compositions

The stabilization of a solution containing polyamine and dihydrobenzoxazine is illustrated with the formulations in Table V in which the polyamine is deactivated by formation of an acid salt or a ketimine. Dihydrobenzoxazine 4 (Example V) is combined with Versamine 552 polyamine at a DHB/amine equivalence ratio of 1.33/1.0. In Example XV A, the amine and dihydrobenzoxazine are dissolved in a mixed butyl cellosolve MIBK solvent. In Example XV B, one equivalent of formic acid for each equivalent of primary amine is added to the formulation. In Example XV C, Versamine 552 diketimine, as prepared in Example XIV, is substituted for the unmodified Versamine 552 on an equimolar basis in a dry MIBK solution.

The solutions are allowed to age at 25° C. and viscosity, dry rubber and visual changes with time are followed. The results are summarized in Tables VI and VII.

When the components of Example XV are mixed to form Example XVA, an immediate viscosity increase is caused by the formation of association complexes of the dihydrobenzoxazine and polyamine molecules in the composition. This viscosity rapidly increases with a corresponding decrease in the D.R. cure time Tables VI and VII. The precipitation of insoluble material is observed after fourteen days and this continues with time. The viscosity data of Table VI show the rapid increase in viscosity for XV A. Viscosity was not recorded after 14 days because of the large amount of product precipitation which started to occur. These effects are primarily caused by substantial coreaction of dihydrobenzoxazine and polyamine.

When the components of Example XV B are mixed after first forming the formic acid salt of the Versamine 552, an immediate high solution viscosity develops. This is apparently due to the very strong molecular association of the protonated cationic amine groups imparting polyelectrolyte behavior. However, the subsequent rate of change of viscosity with aging is much less than in the case of Example XV A. The dry rubber cure shortens at a much slower rate than in the case of the nonacidified composition. The solution remains clear without any precipate or insolubles forming. This indicates the acidified compositions are more stable and do not advance appreciably in molecular weight.

When Example XV C is mixed using the ketimine blocked Versamine 552, a very low viscosity solution is obtained. The ketimine blocked polyamine will not function as readily in forming association complexes as in the case of Examples XV A and B. The dry rubber cure stays above the 600 sec. level. Advancement of the composition appears minimal although the viscosity does increase over the 70 day test period. No insolubles form in this composition.

Both the acid and ketimine methods can be used to stabilize the compositions of this invention and inhibit advancement of molecular weight arising from chemical reaction of the dihydrobenzoxazine with polyamine. The ketimine formation route is more effective in controlling solution viscosity buildup. However when compositions XV B and XV C are coated onto a metal substrate and heated under curing conditions, the acid is volatilized from composition XV B and the MIBK ketimine is hydrolyzed and MIBK volatilized from composition XV C, generating the free polyamine which then reacts with the polydihydrobenzoxazine.

TABLE V

COMPOSITIONS OF EXAMPLES XV A, B, AND C
(Parts by weight)

| Composition | Versamine 552 | Versamine[a] 552 Ketimine 100% Solids | Dihydrobenzoxazine 4 100% Solids | Butyl Cellosolve | MIBK | 90% Formic Acid |
|---|---|---|---|---|---|---|
| XV A | 30.3 | 0 | 41.2 | 17.6 | 10.9 | 0 |
| XV B | 30.3 | 0 | 41.2 | 11.9 | 10.9 | 5.7 |
| XV C | 0 | 39.4[a] | 41.2 | 0 | 19.4 | 0 |

[a]Reaction product from Example XIII, 39.4 parts ketimine solids equivalent to 30.3 parts of Versamine 552.

TABLE VI

AGING EFFECTS OF EXAMPLES XV A, B AND C

| Days at 25° C. | Brookfield Viscosity, Pa sec | | |
|---|---|---|---|
| | XV A | XV B | XV C |
| 0 | 1.2 | 11.5 | 0.25 |
| 15 | 75.0 | 65.0 | 0.45 |
| 30 | heavy precipitate after 21 days | 95.0 | 0.70 |
| 48 | — | 110 | 0.95 |
| 64 | — | 115 | 1.05 |

TABLE VII

AGING EFFECTS OF EXAMPLES XV A, B AND C

| Days @ 25° C. | Dry Rubber cure values @ 135° C., seconds[a] | | |
|---|---|---|---|
| | XV A | XV B | XV C |
| 0 | 315 (0%) | 278 (0%) | 600 |
| 15 | 99 (31%)[b] | 189 (68%) | 600 |
| 30 | 65 (21%)[b] | 185 (67%) | 600 |
| 48 | 44 (14%)[b] | 185 (67%) | 600 |
| 64 | 40 (13%)[b] | 187 (67%) | 600 |

[a]Value in parenthesis is % of original D.R. cure
[b]Insolubles started forming after 15 days in XV A and dry rubber was measured only on soluble portion. XV B and XV C remained clear and homogeneous.

DRY RUBBER CURE TEST

The Dry Rubber Cure Test (D.R. Cure) is used as a basis of comparison of the relative time to gelation of various dihydrobenzoxazine/polyamine compositions. The test is also used to follow aging (advancement) of these compositions with time. The test involves placing 4 to 5 drops of the composition being tested on the center of a flat cure plate controlled at 135° C. A flat 12.2 mm stainless steel spatula is used to spread and butter the compositions over a 25.4 mm diameter area. The time in seconds is recorded from the initial placement on the hot plate until the composition ceases the flow (string) when buttered with the spatula and becomes a rubbery film no longer movable with the spatula.

CARBON-13 NUCLEAR MAGNETIC RESONANCE SPECTROMETRY OF DIHYDROBENZOXAZINE STRUCTURE

Carbon spectra are recorded with a JEOL FX90Q spectrometer at room temperature. Dihydrobenzoxazines are preferably dissolved in chloroform or carbon tetrachloride solvents. Typically solution concentrations in the 30–50% solids range are run. The JEOL FX90Q is equipped with an external Li lock. Quantitative NNE measurement conditions are as follows: Field=22.5 MHz, sample tube Q=10 mm, sweep width=5000 Hz, pulse width=20 microseconds, accumulation=2K, acquisition time=0.819 sec., pulse delay=30 seconds.

Chemicals shifts were related to TMS (0 ppm) and expressed in ppm. Assignments were based on known literature references and values measured on model compounds by methods well known to those skilled in the art. The dihydrobenzoxazine carbons are numbered conventionally.

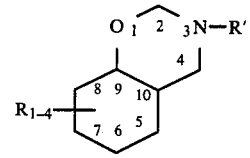

By comparing the carbon at ring position number 9, in a closed ring (~150–154 ppm) relative to the same carbon with the benzoxazine ring open and a —OH group attached (~154–157 ppm) a direct measure of % closed ring benzoxazine is obtained. Measurement of the carbon at ring position number 2, at 7.9 ppm when R' is a benzenoid ring or at 8.2 ppm when R' is a typical alkyl substituent also provides a direct measure of closed benzoxazine ring content. The quantitative relation of these carbons to the rest of the dihydrobenzoxazine carbons can be used to calculate both a % dihydrobenzoxazine content and an effective equivalent weight based on ring content. As those skilled in the art can readily appreciate, the nature of the substituent R and R' and the nature of various side reaction products result in other chemical shifts in the NMR spectra. The assignment of these shifts depends on the structure of the particular benzoxazine and can be used to measure many other structural features of a particular dihydrobenzoxazine.

I claim:

1. A polymerizable composition comprising a poly(3,4-dihydro-3-substituted-1,3-benzoxazine) and a reactive polyamine or polyamine generating compound, wherein the poly(dihydrobenzoxazine) is of number average molecular weight in the range of about 250 to about 2000, with the majority of the individual molecules containing at least two dihydrobenzoxazine groups, and is the reaction product of about 1 equivalent of a primary amine selected from the group consisting of mono- and poly-primary amines, about 1 equivalent of a phenol selected from the group consisting of mono- and poly-phenols having phenolic hydroxy groups with at least one unsubstituted position ortho to such hydroxy groups and about 2 equivalents of formaldehyde, and wherein the reactive polyamine is at least difunctional and its reactive groups are primary or secondary amine.

2. The composition of claim 1 wherein the poly(dihydrobenzoxazine) provides 0.2 to 3.0 equivalents of dihydrobenzoxazine per equivalent of reactive polyamine.

3. The composition of claim 2 wherein the reactive polyamine is a primary amine of number average molecular weight in the range of about 58 to about 15,000 and equivalent weight in the range of about 29 to about 1,500.

4. The composition of claim 2 wherein the reactive polyamine is a secondary amine of number average molecular weight in the range of about 58 to about 15,000 and equivalent weight in the range of about 29 to about 1,500.

5. The composition of claim 1 wherein the polyamine generating compound is selected from the group consisting of ketimines, organic acid salts of amines and oxazolidines.

6. The composition of claim 1 wherein the primary amine reactant for the production of the poly(dihydrobenzoxazine) is an amine of $pK_b$ less than about 7.

7. The composition of claim 1 wherein the primary amine reactant for the production of the poly(dihydrobenzoxazine) is an amine of $pK_b$ at least about 7.

8. The composition of claim 7 wherein the primary amine reactant is a $C_6$ to $C_{30}$ unsubstituted or substituted aromatic amine.

9. The composition of claim 7 wherein the primary amine reactant is a $C_1$ to $C_{40}$ unsubstituted or substituted aliphatic amine.

10. The composition of claim 6 wherein the phenol reactant for the production of the poly(dihydrobenzoxazine) is a $C_6$ to $C_{20}$ phenol or a $C_6$ to $C_{20}$ phenol containing alkyl, alkoxy, aryl, or halo substituents, or a $C_6$ to $C_{30}$ polyphenol or a $C_6$ to $C_{30}$ polyphenol containing alkyl, alkoxy, aryl or halo substituents.

11. The composition of claim 7 wherein the phenol reactant for the production of the poly(dihydrobenzoxazine) is a $C_6$ to $C_{20}$ phenol or a $C_6$ to $C_{20}$ phenol containing alkyl, alkoxy, aryl, or halo substituents, or a $C_6$ to $C_{30}$ polyphenol or a $C_6$ to $C_{30}$ polyphenol containing alkyl, alkoxy, aryl or halo substituents.

12. A polymerizable composition comprising a poly(3,4-dihydro-3-phenyl-1,3-benzoxazine) and a reactive polyamine or polyamine generating compound, wherein the poly(dihydrobenzoxazine) is the reaction product of about 1 equivalent of aniline, about 1 equivalent of a $C_6$ to $C_{30}$ polyphenol selected from the group consisting of unsubstituted polyphenols and phenols substituted with alkyl, alkoxy, aryl or halo substituents and having at least two phenolic hydroxy groups with at least one unsubstituted position ortho to each such phenolic hydroxy groups and about 2 equivalents of formaldehyde and wherein the reactive polyamine is at least difunctional and its reactive groups are primary or secondary amine.

13. The composition of claim 12 wherein the polyamine generating compound is selected from the group consisting of ketimines, organic acid salts of amines and oxazolidines.

14. The composition of claim 12 wherein the $C_6$ to $C_{30}$ polyphenol is selected from the group consisting of hydroquinone, bisphenol A, bis(4-hydroxyphenyl)methane, 4-hydroxyphenyl ether, 4-hydroxyphenyl sulfone, and 4,4'-bisphenol.

15. A polymerizable composition comprising a poly(3,4-dihydro-3-substituted-1,3-benzoxazine) and a reactive polyamine or polyamine generating compound, wherein the poly(dihydrobenzoxazine) is the reaction product of about 1 equivalent of phenol, 1 equivalent of di-primary amine selected from the group consisting of $C_2$ to $C_{40}$ unsubstituted and substituted aliphatic diamines and $C_6$ to $C_{30}$ unsubstituted and substituted aromatic diamines and about 2 equivalents of formaldehyde and wherein the reactive polyamine is at least difunctional and its reactive groups are primary or secondary amine.

16. The composition of claim 15 wherein the polyamine generating compound is selected from the group consisting of ketimines, organic acid salts of amines and oxazolidines.

17. The composition of claim 15 wherein the di-primary amine is selected from the group consisting of ethylene diamine, hexamethylene diamine, p-diaminobenzene and bis(4-aminophenyl)methane.

18. The polymerized composition of claim 1.
19. The polymerized composition of claim 6.
20. The polymerized composition of claim 7.
21. The polymerized composition of claim 12.
22. The polymerized composition of claim 15.

23. A method of polymerizing a composition comprising a poly(3,4-dihydro-3-substituted-1,3-benzoxazine) and a reactive polyamine or polyamine generating compound, wherein the poly(dihydrobenzoxazine) is of number average molecular weight in the range of about 250 to about 2000, with the majority of the individual molecules containing at least two dihydrobenzoxazine groups, and is the reaction product of about 1 equivalent of a primary amine selected from the group consisting of mono- and poly-primary amines, about 1 equivalent of a phenol selected from the group consisting of mono- and poly-phenols having phenolic hydroxy groups with at least one unsubstituted position ortho to such hydroxy groups and about 2 equivalents of formaldehyde, wherein the reactive polyamine is at least difunctional and its reactive groups are primary or secondary amine, said method comprising heating the composition to a temperature in the range of about 50° to about 200° C.

24. The method of claim 23 wherein the polyamine generating compound is selected from the group consisting of ketimines, organic acid salts of amines and oxazolidines.

25. The method of claim 23 wherein the primary amine reactant for the production of the poly(dihydrobenzoxazine) is an amine of $pK_b$ less than about 7.

26. The method of claim 23 wherein the primary amine reactant for the production of the poly(dihydrobenzoxazine) is an amine of $pK_b$ at least about 7.

27. The method of claim 23 wherein polymerization is catalyzed with a polymerization catalyst selected from the group consisting of Lewis acids, metal salts and metal complex compounds.

28. A method of polymerizing a composition comprising a poly(1,3-dihydro-3-substituted-1,3-benzoxazine) and a reactive polyamine or polyamine generating compound, wherein the poly(dihydrobenzoxazine) is the reaction product of about 1 equivalent of aniline, about 1 equivalent of 2,2-bis(4-hydroxyphenyl) propane and about 2 equivalents of formaldehyde, wherein the reactive polyamine is at least difunctional and its reactive groups are primary or secondary amine, said method comprising heating the composition at a temperature in the range of about 50° to about 200° C.

29. The method of claim 28 wherein the polyamine generating compound is selected from the group consisting of ketimines, organic acid salts of amines and oxazolidines.

* * * * *